(12) United States Patent
Jung et al.

(10) Patent No.: US 10,026,216 B2
(45) Date of Patent: Jul. 17, 2018

(54) GRAPHICS DATA PROCESSING METHOD AND APPARATUS

(71) Applicant: Samsung Electronics Co., Ltd., Suwon-si (KR)

(72) Inventors: Seokyoon Jung, Seoul (KR); Jeongsoo Park, Gwacheon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 194 days.

(21) Appl. No.: 14/844,701

(22) Filed: Sep. 3, 2015

(65) Prior Publication Data
US 2016/0217603 A1    Jul. 28, 2016

(30) Foreign Application Priority Data
Jan. 28, 2015 (KR) .................. 10-2015-0013541

(51) Int. Cl.
*G06T 15/20* (2011.01)
(52) U.S. Cl.
CPC .................................. *G06T 15/20* (2013.01)
(58) Field of Classification Search
None
See application file for complete search history.

(56) References Cited

U.S. PATENT DOCUMENTS

| | | |
|---|---|---|
| 3,816,726 A | 6/1974 | Sutherland et al. |
| 6,359,630 B1 | 3/2002 | Morse et al. |
| 7,466,322 B1 | 12/2008 | Moreton et al. |
| 7,542,046 B1 | 6/2009 | Yue et al. |
| 7,551,183 B2 | 6/2009 | Poddar |
| 7,589,746 B2 | 9/2009 | Heim et al. |
| 7,616,218 B1 | 11/2009 | Parikh et al. |
| 7,705,845 B1 | 4/2010 | Parikh et al. |
| 8,068,120 B2 | 11/2011 | Xu et al. |
| 8,115,783 B2 | 2/2012 | Nystad et al. |
| 8,212,840 B2 | 7/2012 | Jiao et al. |
| 8,432,406 B1 | 4/2013 | Yue et al. |
| 8,704,835 B1 | 4/2014 | Hakura et al. |

(Continued)

OTHER PUBLICATIONS

Marco Alamia, "Article—World, View and Projection Transformation Matrices" archived on Mar. 10, 2013, retrieved from https://web.archive.org/web/20130215000000/http://www.codinglabs.net/article_world_view_projection_matrix.aspx.*

(Continued)

*Primary Examiner* — Zhengxi Liu
(74) *Attorney, Agent, or Firm* — Harness, Dickey & Pierce, P.L.C.

(57) ABSTRACT

A graphics data processing method and apparatus are disclosed. The graphics data processing method includes determining a guard band region having a distance range which is predetermined in a viewing direction from a position of a virtual camera, outside a virtualization region representing regions of objects able to be displayed on a screen among a plurality of objects included in graphics data. The method further includes acquiring position information of each of the plurality of objects, determining a region where at least one object among the plurality of objects is located, based on the acquired position information, and performing at least one of clipping and culling on data of the at least one object, based on the determined region.

17 Claims, 8 Drawing Sheets

(56) References Cited

U.S. PATENT DOCUMENTS 8,773,459 B2 7/2014 Jiao et al.
2014/0375637 A1* 12/2014 Heggelund ............. G06T 15/40
345/421

OTHER PUBLICATIONS unknown, "Sutherland-Cohen Line Clipping", archived on Aug. 18, 2011, retrieved from https://www.siggraph.org/education/materials/HyperGraph/scanline/clipping/sucobs.htm.*
Unknown, "Windowing and Clipping (Part 2)—Midpoint Subdivision," retrieved from https://web.archive.org/web/20060901102424/http://zeus.cs.pacificu.edu/ryand/cs360cg/ch41.htm on Sep. 5, 2017, archived from http://zeus.cs.pacificu.edu/ryand/cs360cg/ch41.htm on Sep. 1, 2006.*
I.E. Sutherland, et al., "Reentrant Polygon Clipping," Communications of the ACM, vol. 17, Issue 1, Jan. 1974, pp. 32-42.
Dietrich, Sim. "Guard Band Clipping in Direct3D." Nvidia Corporation, 2008 (7 pages, in English).

* cited by examiner

GRAPHICS DATA PROCESSING METHOD AND APPARATUS

CROSS-REFERENCE TO RELATED APPLICATION(S)

This application claims the benefit of Korean Patent Application No. 10-2015-0013541, filed on Jan. 28, 2015, in the Korean Intellectual Property Office, the entire disclosure of which is incorporated herein by reference for all purposes.

BACKGROUND

1. Field

The present disclosure relates to a graphics data processing method and apparatus, and a recording medium including programmed instructions for implementing the graphics data processing method.

2. Description of Related Art

Recently, devices that display three-dimensional (3D) graphics data on a screen are attracting much attention. For example, the size of the market for user interface (UI) applications applied to mobile devices and devices to which a simulation application is applied is being expanded.

Generally, devices that display 3D graphics data on a screen include a graphic processing unit (GPU). The GPU may perform various graphic operations, such as conversion, rasterizing, shading, and blending, for rendering 3D graphics data. The number of primitives processed by the GPU is millions, and for this reason, a large number of processing and memory resources are consumed for performing graphics operations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According one general aspect, a graphics data processing method may include: determining a guard band region, having a distance range which is predetermined in a viewing direction from a position of a virtual camera, outside a virtualization region representing regions of objects able to be displayed on a screen, from among a plurality of objects included in graphics data; acquiring position information of each of the plurality of objects; determining a region where at least one object among the plurality of objects is located, based on the acquired position information; and performing at least one of clipping and culling of data of the at least one object, based on the determined region.

The determining of the guard band region may include determining, as a first guard band region, a region from a first point to a second point, the first point being a point on a first plane located at a first boundary of the visualization region, and the second point being a point between the virtual camera and the first point.

The determining of the guard band region may include determining, as a second guard band region, a region from a third point to a fourth point, the third point being located on a second plane located at a second boundary of the visualization region, and the fourth point being located at a distance farther away from a third point in the viewing direction.

The performing may include performing clipping on data of an object, among the at least one object, which is located in a region other than the virtualization region and the guard band region.

The graphics data processing method may further include storing depth information of the at least one object when a portion of the at least one object is located in the guard band region and one other portion of the at least one object is located in the visualization region, wherein the at least one object may be rasterized based on the stored depth information.

The determining of the region may include determining positions of a plurality of vertexes included in the at least one object, wherein the performing of the clipping includes: selecting a vertex, which is located between a first vertex included in the virtualization region and a second vertex which is outside the guard band region, from among the plurality of vertexes when one or more vertexes among the plurality of vertexes are included in the visualization region and one or more other vertexes among the plurality of vertexes are outside the guard band region; and performing clipping on vertexes, among the plurality of vertexes, from the selected vertex to the second vertex outside the guard band region when the selected vertex is included in the guard band region.

The graphics data processing method may further include, when the selected vertex is not included in the guard band region, selecting another vertex from among the plurality of vertexes by subtracting or adding a distance range value from or to the selected vertex.

The graphics data processing method may further include selecting an object which is located in a region in a direction opposite to a viewing direction with respect to the position of the virtual camera from the second point, based on the acquired position information of each of the plurality of objects, wherein the performing includes preferentially performing culling on the selected object.

The second point may be a point, having a positive coordinate value, which is located in a viewing direction from an original point indicating the position of the virtual camera, and a coordinate value indicating a position of each of the plurality of objects able to be displayed may be normalized based on the positive coordinate value.

A program for executing the graphics data processing method may be stored on a non-transitory computer-readable storage medium.

According to another general aspect, a graphics data processing apparatus include: a region determiner configured to determine a guard band region, having a distance range which is predetermined in a viewing direction from a position of a virtual camera, outside a virtualization region representing regions of objects able to be displayed on a screen, from among a plurality of objects included in graphics data; a position information acquirer configured to acquire position information of each of the plurality of objects; an object position determiner configured to determine a region where at least one object among the plurality of objects is located, based on the acquired position information; and an object processor configured to perform at least one of clipping and culling on data of the at least one object, based on the determined region.

The region determiner may be configured to determine, as a first guard band region, a region from a first point to a second point, the first point being a point on a first plane located at a first boundary of the visualization region, and the second point being a point between the virtual camera and the first point.

The region determiner may be configured to determine, as a second guard band region, a region from a third point to a fourth point, the third point being located on a second plane located at second boundary of the visualization region, and the fourth point being located at a distance farther away from a third point in the viewing direction.

The object processor may be configured to perform clipping on data of an object, among the at least one object, which is located in a region other than the virtualization region and the guard band region.

The object position determiner may be configured to store depth information of the at least one object when a portion of the at least one object is located in the guard band region and one other portion of the at least one object is located in the visualization region, and the at least one object may be rasterized based on the stored depth information.

The object position determiner may be configured to determine positions of a plurality of vertexes included in the at least one object. When one or more vertexes among the plurality of vertexes are included in the visualization region and one or more other vertexes among the plurality of vertexes are outside the guard band region, the object processor may be configured to select a vertex, which is located between a first vertex included in the virtualization region and a second vertex which is outside the guard band region, from among the plurality of vertexes. When the selected vertex is included in the guard band region, the object processor may be configured to perform clipping on vertexes, among the plurality of vertexes, from the selected vertex to the second vertex outside the guard band region.

When the selected vertex is not included in the guard band region, the object processor may be configured to select another vertex, among the plurality of vertexes, by subtracting or adding a distance range value from or to the selected vertex.

The object position determiner may select an object which is located in a region in a direction opposite to a viewing direction with respect to the position of the virtual camera from the second point, based on the acquired position information of each of the plurality of objects, and the object processor may preferentially perform culling on the selected object.

The second point may be a point, having a positive coordinate value, which is located in a viewing direction from an original point indicating the position of the virtual camera, and a coordinate value indicating a position of each of the plurality of objects able to be displayed may be normalized based on the positive coordinate value.

According to yet another general aspect, a graphics data processing method may include: determining a guard band region, the guard band region being located outside a virtualization region representing regions of objects able to be displayed on a screen, from among a plurality of objects included in graphics data; determining a region where at least one object is located, based on the guard band region and the visualization region; and performing an operation on the at least one object, based on the determined region.

The performing may include performing culling on data of the at least one object, performing clipping on the data of the at least one object, or storing depth information of the at least one object, based on the determined region.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In the disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). Furthermore, when it is described that one comprises (or includes or has) some elements, it should be understood that it may comprise (or include or have) only those elements, or it may comprise (or include or have) other elements as well as those elements if there is no specific limitation.

Hereinafter, example embodiments will be described in detail with reference to the accompanying drawings.

Figure 1:
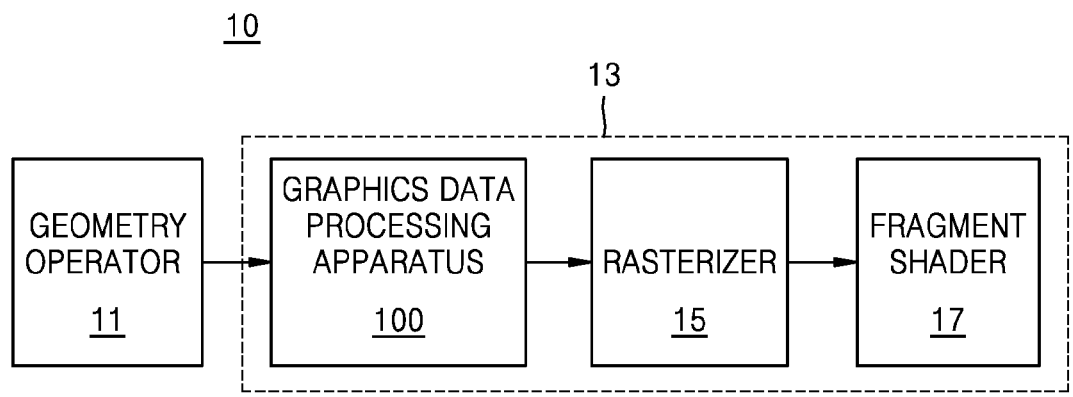
FIG. 1 is a diagram illustrating a pipeline for processing 3D graphics data, according to an embodiment.

FIG. 1 is a diagram illustrating a pipeline 10 for processing 3D graphics data, according to an embodiment.

The pipeline 10 of FIG. 1 is illustrated as including only certain elements associated with the embodiment. Therefore, it will be understood by one of ordinary skill in the art that the pipeline 10 may further include additional, general-use elements in addition to the elements of FIG. 1.

Referring to FIG. 1, the pipeline 10 includes a geometry operator 11 and a fragment operator 13. The geometry operator 11 may change a phase of a vertex in a space. For example, the geometry operator 11 may project coordinates of vertexes onto a screen. The fragment operator 13 may generate a polygon (for example, a triangle) including the vertexes, based on the coordinates of the vertexes which are projected onto the screen by the geometry operator 11. The fragment operator 13 may determine which of pixels constituting a two-dimensional (2D) screen a plurality of the generated polygons are displayed on. Also, the fragment operator 13 may calculate colors, textures, and transparencies of the polygons displayed on the 2D screen.

Hereinafter, a function performed by each of the geometry operator 11 and the fragment operator 13 will be described.

The geometry operator 11 includes a primitive processor, a vertex shader, and a primitive assembler. However, this is merely an example embodiment, and it will be understood by one of ordinary skill in the art that the geometry operator 11 may further include general-use elements.

The primitive processor generates vertexes, based on graphics data received from an application. Here, the application may be, for example, an application using 3D graphics for performing a video game, graphics, a video conference, etc.

The vertex shader changes a 3D position in a virtual space to 2D coordinates and a depth value of a Z buffer so as to display vertexes on a screen.

The primitive assembler collects data about vertexes which are output from the vertex shader and generate a primitive (for example, a line, a point, or a triangle), based on the collected data about the vertexes. Hereinafter, for convenience of description, a primitive will be described as an object.

The fragment operator 13 includes an apparatus 100 (hereinafter referred to as a graphics data processing apparatus) for processing graphics data, a rasterizer 15, and pixel shader or fragment shader 17. However, this is merely an example embodiment, and it will be understood by one of ordinary skill in the art that the fragment operator 13 may further include general-use elements.

The graphics data processing apparatus 100 may perform clipping which is an operation of clipping, or disabling rendering, of a portion of an object or an object, which is not shown on a 2D screen, from among a plurality of objects included in graphics data. By performing clipping, the graphics data processing apparatus 100 decreases loads of arithmetic operations necessary for a next-stage operation and removes an error of an arithmetic operation which occurs because data about an object which is not shown on a screen remains.

The graphics data processing apparatus 100 according to an embodiment classifies a plurality of objects depending on regions where the objects are respectively located, and determine whether to perform clipping on each of the objects. Since the operation cost is expended in an operation of removing an object, the graphics data processing apparatus 100 extracts an object where an error does not occur in the pipeline 10 despite clipping not being performed, and thus, the operation cost expended in clipping is efficiently used.

The graphics data processing apparatus 100 determines a visualization region which is a region of each of objects displayed on a screen. The visualization region may have an arbitrary size depending on a setting thereof. Also, the visualization region may be determined based on distance information in up, down, left, and right directions and a viewing direction with respect to a position of a virtual camera which is a view point of an observer.

The graphics data processing apparatus 100 determines a guard band region of a broader region than the visualization region with respect to the position of the virtual camera. When a GPU uses a fixed decimal point form as an internal processing data form, a possibility that an overflow occurs is far higher than when using a floating-point form. The graphics data processing apparatus 100 may designate a large numerical value as a boundary value of a region in a data size range where an overflow does not occur, and determine the guard band region.

The graphics data processing apparatus 100 may determine the guard band region according to a directional distance and determine whether to perform clipping according to a region where an object is located, thereby efficiently using the cost which is expended in processing graphics data.

The graphics data processing apparatus 100 according to an embodiment may determine the guard band region according to a distance with respect to the position of the virtual camera. In detail, the graphics data processing apparatus 100 may determine the guard band region in a direction from a region close to the visualization region to a region far away from the visualization region. Here, a close region and a far region may be determined based on a large numerical value in a data size range where an overflow does not occur.

The visualization region and the guard band region determined by the graphics data processing apparatus 100 will be described below in detail with reference to FIG. 2.

The rasterizer 15 interpolates screen coordinates and text coordinates which are defined for each vertex of the primitive received from the geometry operation unit 11, thereby generating information of a fragment for the inside of the primitive. In the following embodiments and examples, the terms "fragment" and "pixel" may have the same meaning and may be used interchangeably.

The fragment shader 17 calculates texture mapping and light reflection for each fragment of a frame to determine a respective color of each of the fragments. Also, the fragment shader 17 may remove a fragment (for example, a fragment for an object, which is located behind an opaque object, among a plurality of overlapping objects) which is not necessary for representing an object in the frame. The removed fragment may not be rendered.

Figure 2:
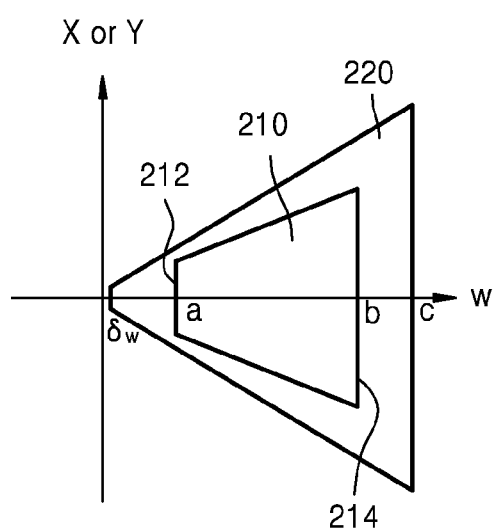
FIG. 2 is a diagram describing a visualization region and a guard band region determined by a graphics data processing apparatus according to an embodiment.

FIG. 2 is a diagram describing a visualization region 210 and a guard band region 220 determined by the graphics data processing apparatus 100 according to an embodiment.

The visualization region 210 may represent a region of each of objects, which are displayed on a 2D screen, from among a plurality of objects included in graphics data. When a position of an object is outside the visualization region 210, the object may not be displayed on the 2D screen. Also, due to objects which are outside the visualization region 210, a screen different from a screen desired by a user may be displayed. The visualization region 210 may represent a view frustum which is a region where a portion shown in rendering is displayed in a figure form.

The guard band region 220 may be determined in a broader region than the visualization region 210. Even in a case where an object is not included in the visualization region 210, the graphics data processing apparatus 100 may not perform clipping on the object when the object is located in the guard band region 220. Objects located in the guard band region 220 are more easily removed by the rasterizer 15 described above with reference to FIG. 1. Therefore, the graphics data processing apparatus 100 may set the guard band region 220, and may not perform clipping but may perform rasterizing on objects included in the guard band region 220 among objects which are outside the visualization region 210, thereby decreasing operation costs expended in clipping.

Referring to FIG. 2, the visualization region 210 may be determined based on a position $V_P$ of a virtual camera. The visualization region 210 may be determined as a radial shape in which up, down, left, and right sizes are enlarged as a position becomes farther away from the position $V_P$ of the virtual camera in a viewing direction.

FIG. 2 is a 2D plan graph which shows positions of objects included in graphics data with respect to an X axis or a Y axis and a W axis. Here, the X axis may indicate left and right positions, and the Y axis may indicate up and down positions. Also, the W axis may indicate how far an object is located in a viewing direction with respect to the position $V_P$ of the virtual camera. When one axis of the 2D plan graph is the X axis and the other axis is the W axis, the positions of the objects included in the graphics data may be represented based on a left-right position and distance. Also, when one axis of the 2D plan graph is the Y axis and the other axis is the W axis, the positions of the objects included in the graphics data may be represented based on an up-down position and distance.

The visualization region 210 according to an embodiment may be determined as a region from a point, which is located at a distance "a", to a point which is located at a distance "b", based on the position $V_P$ of the virtual camera.

In FIG. 2, the guard band region 220 is determined between a point close to the visualization region 210 and a point far away from the visualization region 210 along a viewing direction, based on the position $V_P$ of the virtual camera. However, this is merely an example embodiment, and the graphics data processing apparatus 100 may determine the guard band region 220 in an up-down direction or a left-right direction. However, in the present specification, for convenience of description, the guard band region 220 determined based on the viewing direction will be described. The guard band region 220 may include a first guard band region, which is a region from a first point (which is a point on a first plane 212 which is a near plane located in the viewing direction) to a second point which is a point between the first point and the virtual camera, in the visualization region 210. Also, the guard band region 220 may include a second guard region 220 which is a region from a third point (which is a point on a second plane 214 which is located at a far distance in the viewing direction) to a fourth point which is a point which is located at a distance farther away from the third point in the viewing direction, among the first plane 212 and the second plane 214 which are located in the visualization region 210.

In other words, the guard band region 220 may be determined as a region from a point, located at a distance "$\delta_w$", to a point located at the distance "a" and from a point, located at the distance "b", to a point located at the distance "c".

The graphics data processing apparatus 100 according to an embodiment may set an arbitrary small positive number value "$\delta_w$" to a minimum distance boundary point of the guard band region 220, based on distance coordinates. Here, $\delta_w$ may be used to normalize coordinate values of objects in a perspective division operation which is performed after a clipping operation or a culling operation is performed on the objects. In the perspective division operation, a normalization operation of dividing the coordinate values of the objects by $\delta_w$ may be performed for projecting coordinates of the objects on a screen or a viewport. The graphics data processing apparatus 100 determines $\delta_w$ as the arbitrary small positive number value instead of 0, and thus prevents an error due to coordinate values being divided by 0 in the normalization operation.

Figure 3:
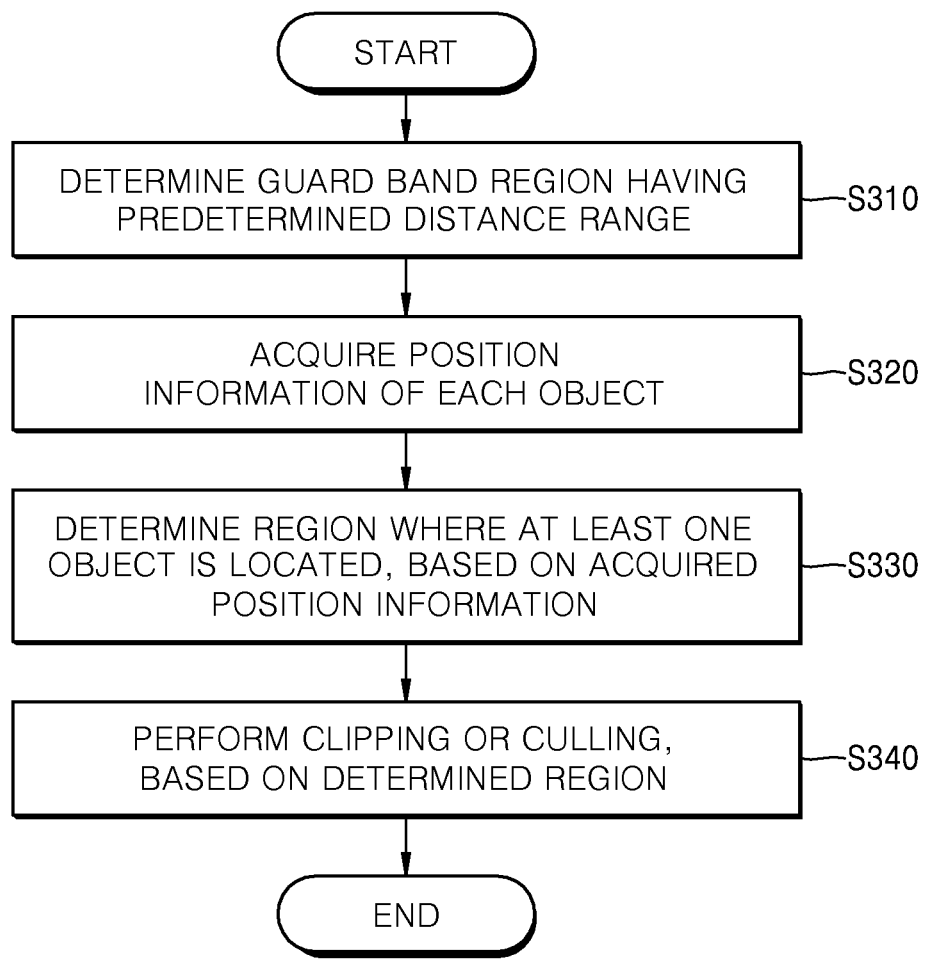
FIG. 3 is a flowchart describing a method in which a graphics data processing apparatus according to an embodiment processes graphics data.

FIG. 3 is a flowchart describing a method in which the graphics data processing apparatus 100 according to an embodiment processes graphics data.

In operation S310, the graphics data processing apparatus 100 determines the guard band region 220, having a distance range which is predetermined in a viewing direction from a position of a virtual camera, outside the virtualization region 210 representing regions of objects able to be displayed on a screen among a plurality of objects included in graphics data. Here, the distance range may be determined based on a near and far degree with respect to the position of the virtual camera. For example, the graphics data processing apparatus 100 may determine, as the guard band region 220, a region from a point (which is located at the distance "a" from a point which is located at the distance "$\delta_w$" from the virtualization region 210) to a point which is located at the distance "c" from a point which is located at the distance "b".

In operation S320, the graphics data processing apparatus 100 acquires position information of each of the plurality of objects. The graphics data processing apparatus 100 may acquire space coordinates of vertexes constituting each of the plurality of objects. When an object is a triangle, the object may be defined by three vertexes.

For example, the graphics data processing apparatus 100 may acquire space coordinates consisting of four components x, y, z, and w. Here, x and y denote horizontal coordinates and vertical coordinates, respectively. Also, z and w denote depth coordinates and distance coordinates, respectively.

In operation S330, the graphics data processing apparatus 100 determines a region where at least one object is located, based on the acquired position information.

The graphics data processing apparatus 100 may compare the position information of the object with position information of a boundary value of the visualization region 210 and the guard band region 220 to determine a region in which the object is located.

The graphics data processing apparatus 100 may determine a region-based priority and may preferentially determine an object which is located in a region which is determined as having a first priority. For example, the graphics data processing apparatus 100 may preferentially determine objects which are located in an external region that is external to a guard band region which is a region to be clipped, thereby reducing operation costs with respect to objects to be removed. This will be described below in detail with reference to FIG. 8.

In operation S340, the graphics data processing apparatus 100 performs at least one of clipping, which is an operation of removing a portion of data of at least one object, and culling, which is an operation of removing all the data of the at least one object, based on the determined region. Here, clipping and culling are merely examples of operations capable of being performed on at least one object by the graphics data processing apparatus 100. The graphics data processing apparatus 100 may perform an operation of storing depth information of an object, or may not perform any operation on the object, based on the determined region.

For example, when all vertexes constituting an object are outside the visualization region 210, the graphics data processing apparatus 100 may perform culling on the vertexes constituting the object.

As another example, when some vertexes among the vertexes constituting an object are included in the visualization region 210 and other vertexes among the vertexes constituting the object are outside the guard band region 220, the graphics data processing apparatus 100 may perform clipping on vertexes from an arbitrary vertex, which is selected from the guard band region 220, to a vertex which is outside the guard band region 220. The graphics data processing apparatus 100 may remove vertexes which are outside the guard band region 220, based on the selected arbitrary vertex, thereby preventing an overflow from occurring in an arithmetic operation. Also, the graphics data processing apparatus 100 may subtract or add a distance value between a first vertex of the visualization region 210 and a second vertex which is outside the guard band region 220, thereby selecting a vertex which is a reference for performing clipping. This will be described below in detail with reference to FIG. 6.

As another example, when some vertexes among vertexes constituting an object are included in the visualization region 210 and the other vertexes among the vertexes constituting the object are included in the guard band region 220, the graphics data processing apparatus 100 may store depth information of the object. The graphics data processing apparatus 100 may not perform clipping, but may allow vertexes of an object which is not outside the guard band region 220 to be rasterized, thereby reducing operation costs expended in clipping. The rasterizer 15 described above with reference to FIG. 1 may rasterize an object, based on depth information of the object stored by the graphics data processing apparatus 100.

As another example, when all vertexes constituting an object are included in the visualization region 210, the graphics data processing apparatus 100 may not perform a separate operation on the vertexes of the object.

Figure 4:
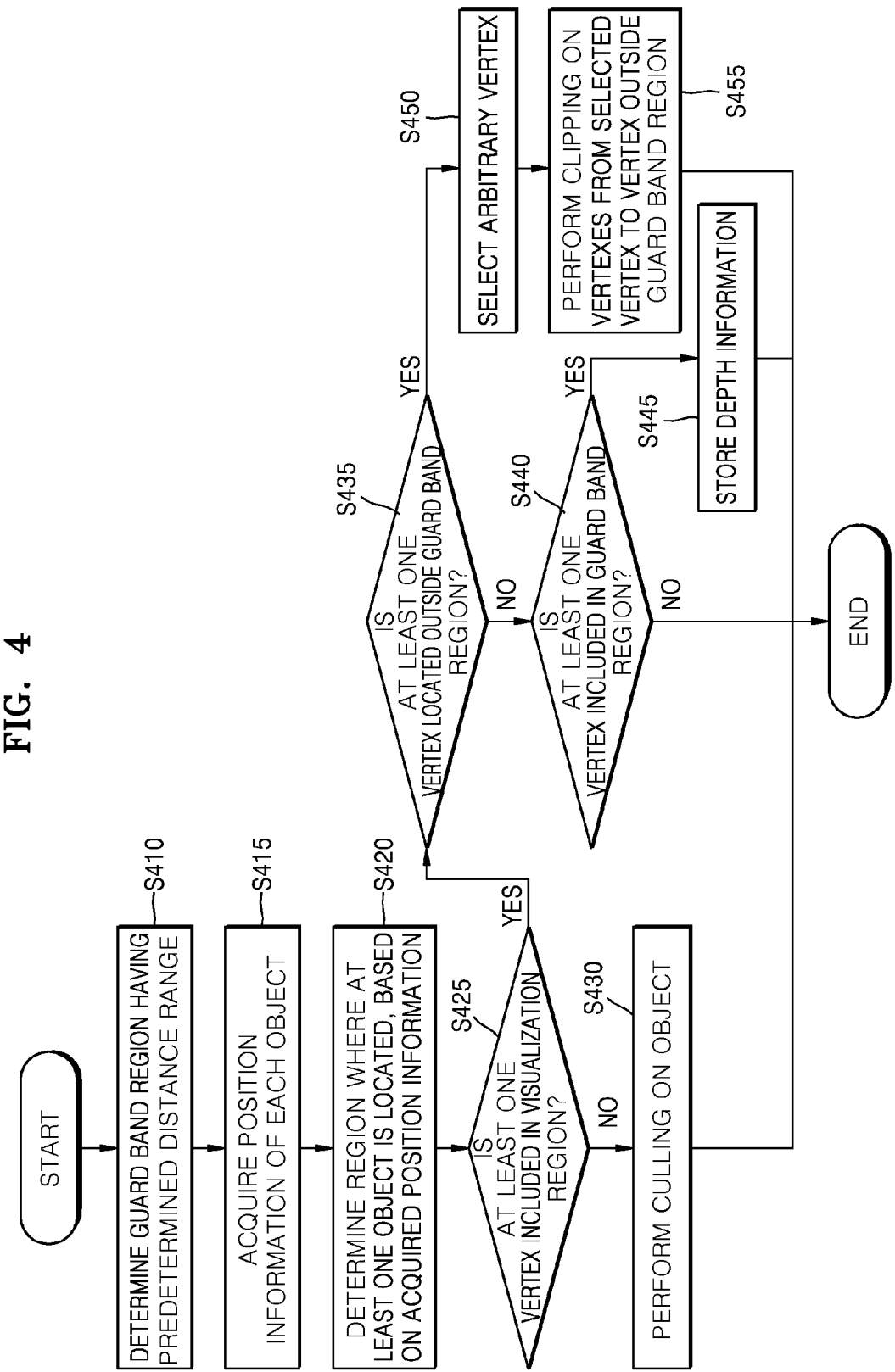
FIG. 4 is a flowchart describing a method in which a graphics data processing apparatus according to an embodiment determines whether to perform clipping, based on a position of an object.

FIG. 4 is a flowchart describing a method in which the graphics data processing apparatus 100 according to an embodiment determines whether to perform clipping, based on a position of an object.

In operation S410, the graphics data processing apparatus 100 determines the guard band region 220, having a distance range which is predetermined in a viewing direction from a position of a virtual camera, outside the virtualization region 210 representing regions of objects able to be displayed on a screen among a plurality of objects included in graphics data. Here, the visualization region 210 may be determined as a radial shape in which up, down, left, and right sizes are enlarged as a position becomes farther away from the position $V_P$ of the virtual camera in a viewing direction. However, this is merely an example embodiment, and the graphics data processing apparatus 100 may determine the guard band region 220 in an up-down direction or a left-right direction. Operation S410 may correspond to operation S310 described above with reference to FIG. 3.

In operation S415, the graphics data processing apparatus 100 acquires position information of each of the plurality of objects. The graphics data processing apparatus 100 may acquire space coordinates of vertexes constituting each of the plurality of objects. For example, the graphics data processing apparatus 100 may acquire space coordinates consisting of four components x, y, z, and w. Here, x and y denote horizontal coordinates and vertical coordinates, respectively. Also, z and w denote depth coordinates and distance coordinates, respectively. Operation S415 may correspond to operation S320 described above with reference to FIG. 3.

In operation S420, the graphics data processing apparatus 100 determines a region where at least one object is located, based on the acquired position information.

The graphics data processing apparatus 100 may compare the position information of each object with position information of a boundary value of the visualization region 210 and the guard band region 220 to determine a region wherein which each object is located. Operation S420 may correspond to operation S330 described above with reference to FIG. 3.

In operation S425, the graphics data processing apparatus 100 determines whether some vertexes among the vertexes constituting the object are included in the visualization region 210.

If it is determined in operation S425 that none of the vertexes constituting the object are included in the visualization region 210, in operation S430, the graphics data processing apparatus 100 performs culling on the object. The graphics data processing apparatus 100 according to an embodiment performs culling on all the vertexes constituting the object when all the vertexes constituting the object are located outside the guard band region 220.

If it is determined in operation S425 that at least one of the vertexes constituting the object is included in the visualization region 210, in operation S435, the graphics data processing apparatus 100 determines whether at least one other portion of the object is located outside the guard band region 220. That is, the graphics data processing apparatus determines whether at least one other vertex constituting the object is located outside the guard band region 220.

If it is determined in operation S435 that none of the other vertexes constituting the object are located outside the guard band region, in operation S440, the graphics data processing apparatus 100 determines whether at least one other portion, or vertex, of the object is included in the guard band region 220. When none of the other vertexes are located in the guard band region (i.e., all the vertexes are included in the visualization region 210), the graphics data processing apparatus 100 does not perform a separate operation of the vertexes constituting the object.

If it is determined in operation S440 that at least one other vertex is located in the guard band region 220, in operation S445, the graphics data processing apparatus 100 stores depth information of the object. When some of the vertexes of the object are included in the visualization region 210 and other vertexes of the object are included in the guard band region 220, the depth information of the object may be used for the rasterizer 15 to rasterize the other vertexes included in the guard band region 220.

Moreover, when the vertexes of the object are located in the guard band region 220, the graphics data processing apparatus 100 may perform a simplification processing operation on the vertexes of the object. The simplification processing operation may be an operation which leaves a first vertex and a last vertex of the vertexes located in the guard band region 220 and removes pieces of information about the other vertexes.

Backtracking, if it is determined in operation S435 that at least one other vertex is located outside in the guard band region 220, in operation S450, the graphics data processing apparatus 100 selects an arbitrary vertex between a first vertex of the object which is located in the visualization region 210, and a second vertex of the object which is located outside the guard band region 220.

In operation S455, when the selected arbitrary vertex is included in the guard band region 220, the graphics data processing apparatus 100 performs clipping on vertexes from the selected arbitrary vertex to the second vertex which is located outside the guard band region 220.

A method in which the graphics data processing apparatus 100 performs re-setting in order for vertexes to be located in the guard band region 220 will be described below in detail with reference to FIGS. 6 and 7.

Figure 5A:
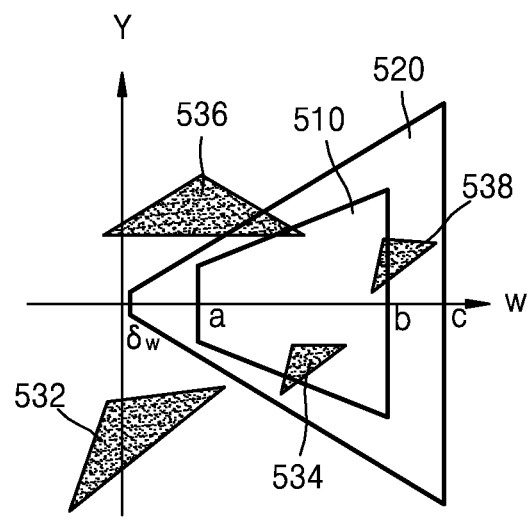
FIGS. 5A and 5B are diagrams describing in detail a method in which a graphics data processing apparatus according to an embodiment performs clipping, based on a position of an object.
Figure 5B:
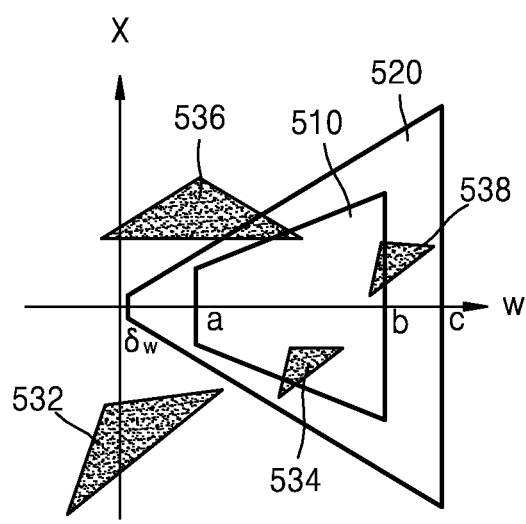

FIGS. 5A and 5B are diagrams describing in detail a method in which the graphics data processing apparatus 100 according to an embodiment performs clipping, based on a position of an object.

FIG. 5A shows a 2D graph where positions of objects 532, 534, 536 and 538 are marked with respect to a Y axis indicating vertical coordinates and a W axis indicating distance coordinates indicating distances in a viewing direction from a position of a virtual camera. In FIG. 5A, a visualization region 510 may be determined within a distance range from a point located at a distance "a" to a point located at a distance "b", with respect to a position of a virtual camera.

A guard band region 520 may be determined between a point closer to and a point farther away from the visualization region 510 along the viewing direction with respect to the position of the virtual camera. However, this is merely an example embodiment, and the graphics data processing apparatus 100 may determine the guard band region 520 as a region from a point located at a distance "$\delta_w$," to a point located at the distance "a," and from a point, located at the distance "b", to a point located at the distance "c".

According to an embodiment, graphics data may include an object "1" 532, an object "2" 534, an object "3" 536, and an object "4" 538. The graphics data processing apparatus 100 may acquire space coordinates of the object "1" 532 and determine whether a position of the object "1" 532 is outside the guard band region 520. The graphics data processing apparatus 100 may perform culling on the object "1" 532 in order to prevent an overflow from occurring due to the object "1" 532, which is outside the guard band region 520.

The graphics data processing apparatus 100 may check to determine that the object "2" 534 is located in the visualization region 510 and the guard band region 520. The graphics data processing apparatus 100 may not perform clipping on the object "2" 534 which is outside the visualization region 510 and is located in the guard band region 520, and may store depth information of the object "2" 534 for which rasterizing is to be performed later.

The graphics data processing apparatus 100 may check to determine that some vertexes of the object "3" 536 are included in the visualization region 510 and the other some vertexes are located outside the guard band region 520. The graphics data processing apparatus 100 may clip vertexes which are outside the guard band region 520 with respect to an arbitrary vertex which is located in the guard band region 520. For example, the graphics data processing apparatus 100 may change vertexes, which are outside the guard band region 520, to a vertex located in the guard band region 520 through a repetitive search method which sequentially search for positions such as positions at ½, ¼, and ⅛ of a distance between a vertex located in the visualization region 510 and a vertex located outside the guard band region 520. The graphics data processing apparatus 100 may subtract or add a predetermined distance value from or to a first vertex located in the visualization region 520 and a second vertex located outside the guard band region 520, thereby selecting an arbitrary vertex located in the guard band region 520.

The graphics data processing apparatus 100 may check to determine that the object "4" 538 is located in the visualization region 510 and the guard band region 520. The graphics data processing apparatus 100 may not perform clipping on some vertexes of the object "4" 538 which is outside the visualization region 510 and is located in the guard band region 520, and may store depth information of the object "4" 538 for which rasterizing is to be performed later.

FIG. 5B shows a 2D graph where positions of objects 532, 534, 536 and 538 are marked with respect to a Y axis indicating vertical coordinates and a W axis indicating distance coordinates indicating distances in a viewing direction from a position of a virtual camera. A method in which the graphics data processing apparatus 100 processes the objects 532, 534, 536 and 538 is as described above with reference to FIG. 5A.

Figure 6:
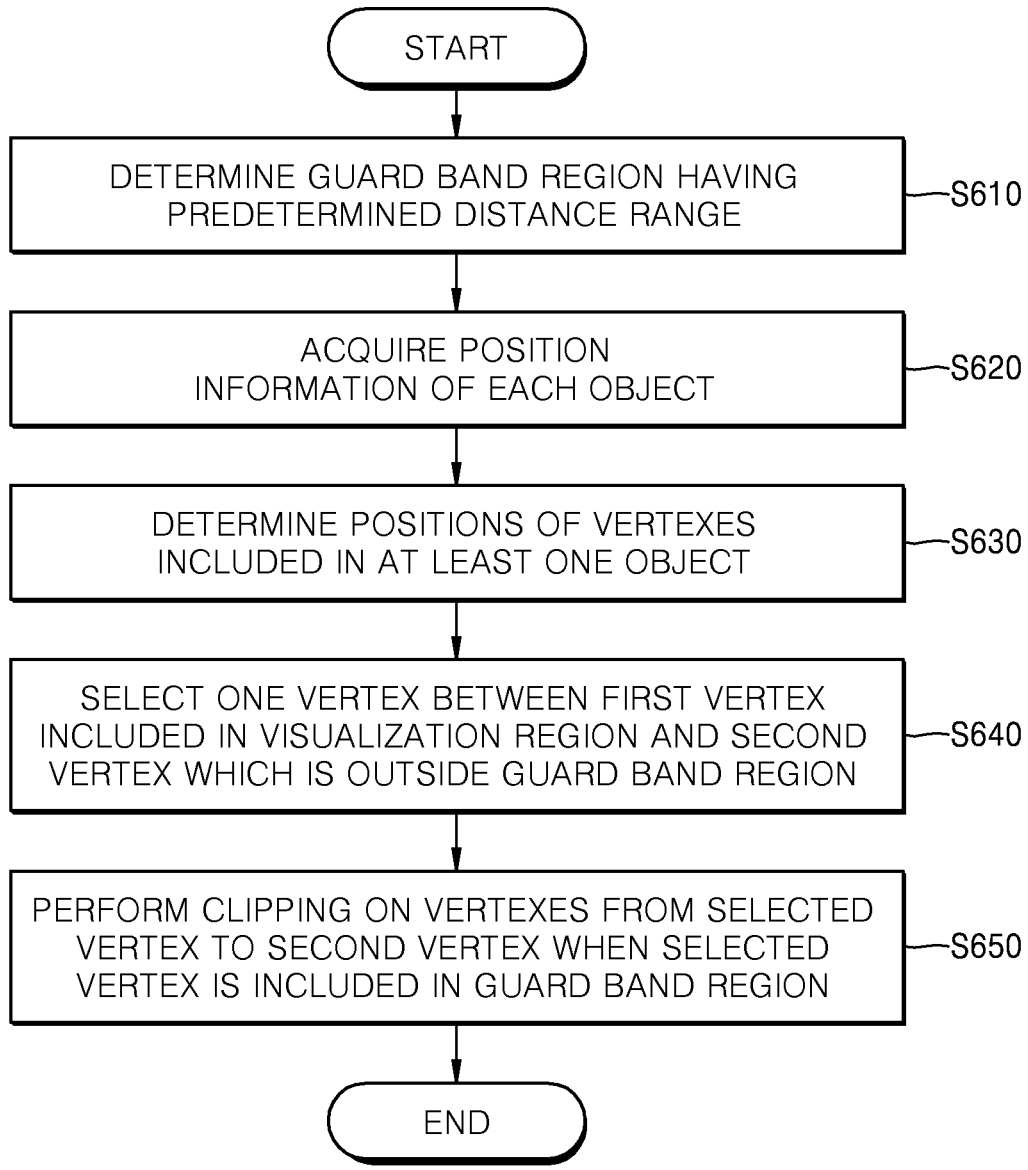
FIG. 6 is a flowchart describing a method in which a graphics data processing apparatus newly defines a vertex located in a guard band region when a portion of an object is outside the guard band region and performs clipping, according to an embodiment.

FIG. 6 is a flowchart describing a method in which the graphics data processing apparatus 100 newly defines a vertex located in the guard band region 220 when a portion of an object is outside the guard band region 220 and performs clipping, according to an embodiment.

In operation S610, the graphics data processing apparatus 100 determines the guard band region 220 in a distance range which is predetermined based on a position of a virtual camera, which is a reference point of the virtualization region 210 representing regions of objects able to be displayed on a screen among a plurality of objects included in graphics data. Here, the visualization region 210 may be determined as a radial shape in which up, down, left, and right sizes are enlarged as a position becomes farther away from the position $V_P$ of the virtual camera in a viewing direction. However, this is merely an example embodiment, and the graphics data processing apparatus 100 may determine the guard band region 220 in an up-down direction or a left-right direction. Operation S610 may correspond to operation S310 described above with reference to FIG. 3.

In operation S620, the graphics data processing apparatus 100 acquires position information of each of the plurality of objects. The graphics data processing apparatus 100 may acquire space coordinates of vertexes constituting each of the plurality of objects. For example, the graphics data processing apparatus 100 may acquire space coordinates including of four components x, y, z, and w. Here, x and y denote horizontal coordinates and vertical coordinates, respectively. Also, z and w denote depth coordinates and distance coordinates, respectively. Operation S620 may correspond to operation S320 described above with reference to FIG. 3.

In operation S630, the graphics data processing apparatus 100 determines a region where vertexes included in at least one object are located, based on the acquired position information.

The graphics data processing apparatus 100 may compare the position information of each object with position information of a boundary value of the visualization region 210 and the guard band region 220 to determine a region where the vertexes constituting the at least one object are located.

In operation S640, the graphics data processing apparatus 100 selects one vertex between a first vertex, which is included in the visualization region 210, and a second vertex which is outside the guard band region 220.

The graphics data processing apparatus 100 may replace vertexes, which are outside the guard band region 220 among a plurality of vertexes, with an arbitrary vertex located in the guard band region 220. The graphics data processing apparatus 100 may change vertexes, which are outside the guard band region 220, to a vertex located in the guard band region 220 through a repetitive search method which sequentially search for positions such as positions as ½, ¼, and ⅛ of a distance between a vertex located in the visualization region 210 and a vertex located outside the guard band region 220. Here, the graphics data processing apparatus 100 may subtract or add a predetermined distance value from or to a first vertex located in the visualization region 220 and a second vertex located outside the guard band region 220, thereby selecting an arbitrary vertex located in the guard band region 220.

In operation S650, when the selected arbitrary vertex is included in the guard band region 220, the graphics data processing apparatus 100 performs clipping on vertexes from the selected arbitrary vertex to the second vertex which is outside the guard band region 220.

The graphics data processing apparatus 100 may store the first vertex and a newly determined vertex as vertex data about an object. The graphics data processing apparatus 100 may remove data about the second vertex which is outside the guard band region 220.

The graphics data processing apparatus 100 according to an embodiment may not perform a division operation necessary for a general clipping operation. According to an embodiment, an arithmetic operation is performed with only an integer ratio such as ½, ¼, etc., and thus, an error caused by an arithmetic operation error is reduced.

Figure 7:
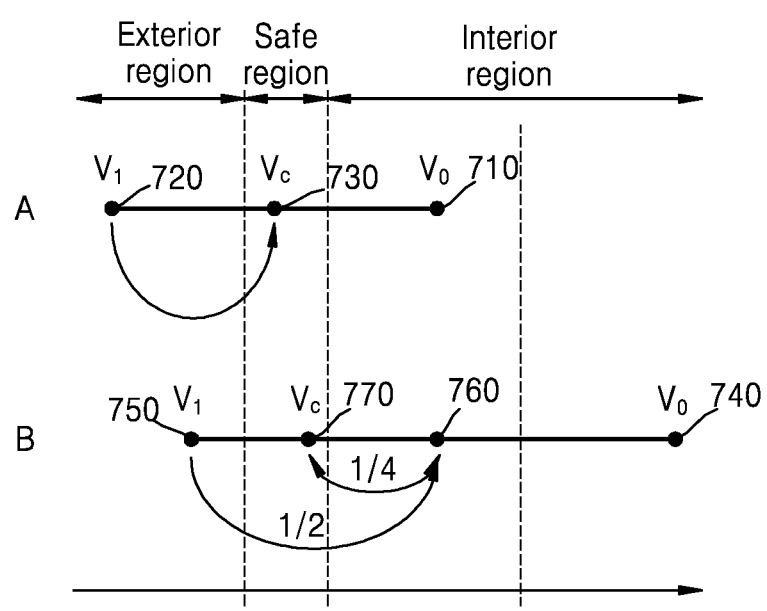
FIG. 7 is a diagram describing a method in which a graphics data processing apparatus newly defines a vertex located in a guard band region when a portion of an object is outside the guard band region and performs clipping, according to an embodiment.

FIG. 7 is a flowchart describing a method in which the graphics data processing apparatus 100 newly defines a vertex located in the guard band region 220 when a portion of an object is outside the guard band region 220 and performs clipping, according to an embodiment.

In FIG. 7, the graphics data processing apparatus 100 replaces vertexes which are outside the guard band region 220, among a plurality of vertexes, with an arbitrary vertex located in the guard band region 220.

For example, in case A of FIG. 7, the graphics data processing apparatus 100 may determine a third vertex 730 which is located at a position at a distance halfway between a first vertex 710, which is located in the visualization region 210 (corresponding to the "Interior region" in FIG. 7), and a second vertex 720 which is located in a region (corresponding to the "Exterior region" in FIG. 7) outside the guard band region 220 (corresponding to the "Safe region" in FIG. 7). The graphics data processing apparatus 100 may determine a region where the determined third vertex 730 is located. The graphics data processing apparatus 100 may determine the third vertex 730 as a new vertex constituting an object when the third vertex 730 is located in the guard band region 220.

According to another example shown in case B of FIG. 7, the graphics data processing apparatus 100 may determine a third vertex 760 which is located at a position at a distance halfway between a first vertex 740, which is located in the visualization region 210 (corresponding to the "Interior region" in FIG. 7), and a second vertex 750 which is located in a region (corresponding to the "Exterior region" in FIG. 7) outside the guard band region 220 (corresponding to the "Safe region" in FIG. 7). The graphics data processing apparatus 100 may determine a region where the determined third vertex 760 is located. When the third vertex 760 is in a region (corresponding to the "Interior region" in FIG. 7) outside the guard band region 220, the graphics data processing apparatus 100 may determine a fourth vertex 770 at a at a distance that is one-fourth of the distance between the first vertex 740 and the second vertex 750 which is located outside the guard band region 220. The graphics data processing apparatus 100 may determine a region where the determined fourth vertex 770 is located. The graphics data processing apparatus 100 may determine the fourth vertex 770 as a new vertex constituting an object when the fourth vertex 770 is located in the guard band region 220 (corresponding to the "Safe region" in FIG. 7).

Figure 8:
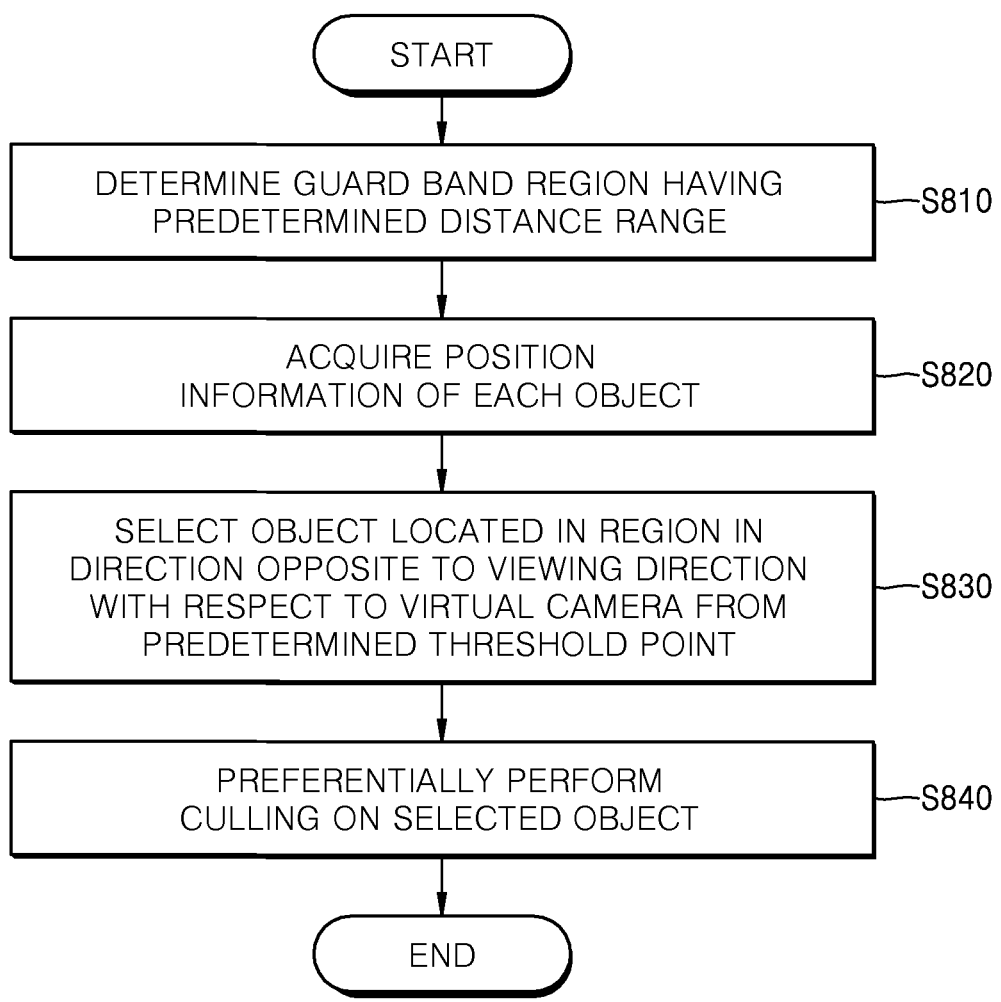
FIG. 8 is a diagram describing a method in which a graphics data processing apparatus preferentially performs clipping on an object which is located in a region in a direction opposite to a viewing direction with respect to a position of a virtual camera, according to an embodiment.

FIG. 8 is a diagram describing a method in which the graphics data processing apparatus 100 preferentially performs clipping of an object which is located in a region in a direction opposite to a viewing direction with respect to a position of a virtual camera, according to an embodiment.

In operation S810, the graphics data processing apparatus 100 determines the guard band region 220, having a distance range which is predetermined in a viewing direction from a position of a virtual camera, outside the virtualization region 210 representing regions of objects able to be displayed on a screen among a plurality of objects included in graphics data. Here, the visualization region 210 may be determined as a radial shape in which up, down, left, and right sizes are enlarged as a position becomes farther away from the position $V_P$ of the virtual camera in a viewing direction. However, this is merely an example embodiment, and the graphics data processing apparatus 100 may determine the guard band region 220 in an up-down direction or a left-right direction. Operation S810 may correspond to operation S310 described above with reference to FIG. 3.

In operation S820, the graphics data processing apparatus 100 acquires position information of each of the plurality of objects. The graphics data processing apparatus 100 may acquire space coordinates of vertexes constituting each of the plurality of objects. For example, the graphics data processing apparatus 100 may acquire space coordinates consisting of four components x, y, z, and w. Here, x and y denote horizontal coordinates and vertical coordinates, respectively. Also, z and w denote depth coordinates and distance coordinates, respectively. Operation S820 may correspond to operation S320 described above with reference to FIG. 3.

In operation S830, the graphics data processing apparatus 100 selects an object, which is located in a region in a direction opposite to a viewing direction with respect to the position of the virtual camera from a predetermined threshold point, from among a plurality of objects.

The object, which is located in the region in the direction opposite to the viewing direction with respect to the position of the virtual camera, may be treated as a case of being located behind a lens of a camera, causing an arithmetic operation error in rendering data. Therefore, the graphics data processing apparatus 100 may perform clipping or culling on objects, which are located in the region in the direction opposite to the viewing direction with respect to the position of the virtual camera, among a plurality of objects.

Here, when the position of the virtual camera is set to an original point, the region in the direction opposite to the viewing direction with respect to the position of the virtual camera may denote a region having a negative coordinate value in a horizontal direction.

The graphics data processing apparatus 100 may acquire information about the space coordinates of the vertexes constituting each of the plurality of objects and detect objects including vertexes having the negative coordinate value in the horizontal direction.

In operation S840, the graphics data processing apparatus 100 preferentially performs culling on an object selected from among the plurality of objects.

The graphics data processing apparatus 100 may preferentially perform culling on objects, which are located in the region in the direction opposite to the viewing direction with respect to the position of the virtual camera, among the plurality of objects included in the graphics data and thus may not perform an unnecessary arithmetic operation on objects which are to be removed from the graphics data.

Figure 9:
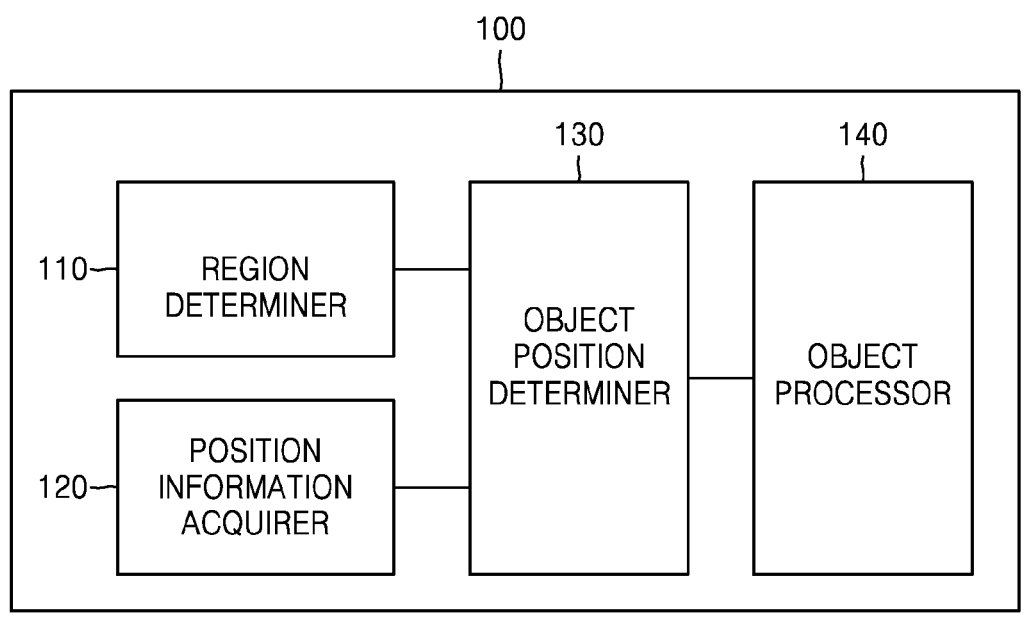
FIG. 9 is a block diagram of a graphics data processing apparatus according to an embodiment.

FIG. 9 is a block diagram of the graphics data processing apparatus 100 according to an embodiment.

As illustrated in FIG. 9, the graphics data processing apparatus 100 includes a region determiner 110, a position information acquirer 120, an object position determiner 130, and an object processor 140. However, the graphics data processing apparatus 100 may include additional elements, in addition to the illustrated elements. Alternatively, the graphics data processing apparatus 100 may include less elements than the number of illustrated elements.

Hereinafter, the elements 110, 120, 130 and 140 will be described in order.

The region determiner 110 determines a visualization region, which represents regions of objects able to be displayed on a screen among a plurality of objects included in graphics data, and a guard band region which is located within a predetermined distance range with respect to a position of a virtual camera.

In detail, based on the position of the virtual camera, the region determiner 110 may determine, as a first guard band region, a region from a first point (which is a point on a near plane located in a viewing direction) to a second point which is a point between the first point and the virtual camera, in the visualization region. Also, the region determiner 110 may determine, as a second guard band region, a region from a third point (which is a point on a second plane which is located at a far distance in the viewing direction) to a fourth point which is a point which is located at a distance farther away from the third point in the viewing direction, among the first plane and the second plane which are located in the visualization region. The position information acquirer 120 may acquire position information of each of the plurality of objects included in the graphics data.

The object position determiner 130 determines a region where at least one object is located, based on the acquired position information. The object position determiner 130 may determine a region where vertexes included in the at least one object are located, based on space coordinates of the vertexes included in the at least one object.

The object position determiner 130 according to an embodiment may determine which of the virtualization region, the guard band region, and an external region of the guard band region the at least one object is located in. When a portion of the at least one object is located in the guard band region and other one portion of the at least one object is located in the virtualization region, the object position determiner 130 may select at least one of an operation which performs clipping on a portion of the at least one object, and an operation which stores identification information for detecting at least one object in a subsequent rasterizing operation.

When at least one object is located in the guard band region, the object position determiner 130 detects at least one object in a subsequent rasterizing operation and stores at least one piece of identification information for performing rasterizing.

The object position determiner 130 may select one vertex, which is located between a first vertex included in the virtualization region and a second vertex which is outside the guard band region, from among a plurality of vertexes constituting an object and determine the selected one vertex as a vertex constituting the object. The object position determiner 130 may control the object processor 140 to perform clipping on the second vertex which is outside the guard band region.

The object position determiner 130 may select an object which is located in a region in a direction opposite to a viewing direction with respect to the position of the virtual camera from a predetermined threshold point, based on the acquired position information of the plurality of objects. Here, the threshold point may be an X coordinate value or a Y coordinate value which is located in the viewing direction with respect to the position of the virtual camera and is an arbitrary small positive value.

The object position determiner 130 controls the object processor 140 to preferentially perform clipping on the selected object.

The object processor 140 performs clipping or culling, based on the determined region. The object processor 140 may perform clipping on data of an object which is located in a region other than the virtualization region and the guard band region.

The object processor 140 may perform clipping on a vertex, which is outside the guard band region, of an object where some of a plurality of vertexes are included in the virtualization region and the other some vertexes are outside the guard band region.

The object processor 140 may preferentially perform clipping or culling on an object which is located in the region in the direction opposite to the viewing direction with respect to the position of the virtual camera selected by the object position determiner 130.

The apparatuses, units, modules, devices, and other components illustrated in FIGS. 1 and 9 that perform the operations described herein with respect to FIGS. 2-8 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2-8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-8 that perform the operations described herein with respect to FIGS. 1 and 9 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A graphics data processing method comprising:
   determining a guard band region, having a distance range in a viewing direction from a position of a virtual camera, outside a visualization region representing regions of objects able to be displayed on a screen, from among a plurality of objects included in graphics data;
   acquiring position information of each of the plurality of objects;
   determining a region where at least one object among the plurality of objects is located, based on the acquired position information, the at least one object including a plurality of vertexes, the determining the region including determining positions of the plurality of vertexes; and
   performing clipping on data of the at least one object, based on the determined region, the performing the clipping including,
      selecting a particular vertex from among the plurality of vertexes based on one or more vertexes among the plurality of vertexes being in the visualization region and one or more other vertexes among the plurality of vertexes being outside the guard band region, the selected particular vertex located between a first vertex and a second vertex, the first vertex in the visualization region, the second vertex outside the guard band region, and
      performing clipping on vertexes from the selected particular vertex to the second vertex outside the guard band region based on a determination that the selected particular vertex is within an interior of the guard band region, such that both a portion of the at least one object that is located outside the guard band region and a portion of the at least one object that is located between the selected particular vertex and an edge of the guard band region and within the interior of the guard band region are clipped.

2. The graphics data processing method of claim 1, wherein the determining of the guard band region comprises determining, as a first guard band region, a region from a first point to a second point, the first point being a point on a first plane located at a first boundary of the visualization region, and the second point being a point between the virtual camera and the first point.

3. The graphics data processing method of claim 2, further comprising selecting an object which is located in a region in a direction opposite to the viewing direction with respect to the position of the virtual camera from the second point, based on the acquired position information of each of the plurality of objects,
    wherein the performing comprises preferentially performing culling on the selected object.

4. The graphics data processing method of claim 2, wherein:
    the second point is a point, having a positive coordinate value, which is located in the viewing direction from an original point indicating the position of the virtual camera; and
    a coordinate value indicating a position of each of the plurality of objects able to be displayed is normalized based on the positive coordinate value.

5. The graphics data processing method of claim 1, wherein the determining of the guard band region comprises determining, as a second guard band region, a region from a third point to a fourth point, the third point being located on a second plane located at a second boundary of the visualization region, and the fourth point being located at a distance farther away from the third point in the viewing direction.

6. The graphics data processing method of claim 1, wherein the performing comprises performing clipping on data of an object, among the at least one object, which is located in a region other than the visualization region and the guard band region.

7. The graphics data processing method of claim 1, further comprising storing depth information of the at least one object when a portion of the at least one object is located in the guard band region and one other portion of the at least one object is located in the visualization region,
    wherein the at least one object is rasterized based on the stored depth information.

8. The graphics data processing method of claim 1, further comprising, when the selected particular vertex is not included in the guard band region, selecting another vertex from among the plurality of vertexes by subtracting or adding a distance range value from or to the selected particular vertex.

9. A non-transitory computer-readable storage medium storing a program for executing the graphics data processing method of claim 1.

10. A graphics data processing apparatus comprising:
    a memory storing a program of instructions; and
    a processor configured to execute the program of instructions to
        determine a guard band region, having a distance range in a viewing direction from a position of a virtual camera, outside a visualization region representing regions of objects able to be displayed on a screen, from among a plurality of objects included in graphics data;
        acquire position information of each of the plurality of objects;
        determine a region where at least one object among the plurality of objects is located, based on the acquired position information, the at least one object including a plurality of vertexes, the determining the region including determining positions of the plurality of vertexes; and
    perform clipping on data of the at least one object, based on the determined region, the performing the clipping including,
        selecting a particular vertex from among the plurality of vertexes based on one or more vertexes among the plurality of vertexes being in the visualization region and one or more other vertexes among the plurality of vertexes being outside the guard band region, the selected particular vertex located between a first vertex and a second vertex, the first vertex in the visualization region, the second vertex outside the guard band region, and
        performing clipping on vertexes from the selected particular vertex to the second vertex outside the guard band region based on a determination that the selected particular vertex is within an interior of the guard band region, such that both a portion of the at least one object that is located outside the guard band region and a portion of the at least one object that is located between the selected particular vertex and an edge of the guard band region and within the interior of the guard band region are clipped.

11. The graphics data processing apparatus of claim 10, wherein the processor is configured to execute the program of instructions to determine, as a first guard band region, a region from a first point to a second point, the first point being a point on a first plane located at a first boundary of the visualization region, and the second point being a point between the virtual camera and the first point.

12. The graphics data processing apparatus of claim 11, wherein the processor is configured to execute the program of instructions to:
    select an object which is located in a region in a direction opposite to the viewing direction with respect to the position of the virtual camera from the second point, based on the acquired position information of each of the plurality of objects; and
    preferentially perform culling on the selected object.

13. The graphics data processing apparatus of claim 12, wherein:
    the second point is a point, having a positive coordinate value, which is located in the viewing direction from an original point indicating the position of the virtual camera; and
    a coordinate value indicating a position of each of the plurality of objects able to be displayed is normalized based on the positive coordinate value.

14. The graphics data processing apparatus of claim 10, wherein the processor is configured to execute the program of instructions to determine, as a second guard band region, a region from a third point to a fourth point, the third point being located on a second plane located at second boundary of the visualization region, and the fourth point being located at a distance farther away from the third point in the viewing direction.

15. The graphics data processing apparatus of claim 10, wherein the processor is configured to execute the program of instructions to perform clipping on data of an object, among the at least one object, which is located in a region other than the visualization region and the guard band region.

16. The graphics data processing apparatus of claim 10, wherein:
    the processor is configured to execute the program of instructions to store depth information of the at least one object when a portion of the at least one object is located in the guard band region and one other portion of the at least one object is located in the visualization region; and the at least one object is rasterized based on the stored depth information.

17. The graphics data processing apparatus of claim 10, wherein the processor is configured to execute the program of instructions to select another vertex from among the plurality of vertexes by subtracting or adding a distance range value from or to the selected particular vertex, based on the selected particular vertex being not included in the guard band region.

\* \* \* \* \*